L. W. CHUBB.
SYSTEM OF WATER DISTRIBUTION.
APPLICATION FILED JAN. 15, 1913.
1,108,550. Patented Aug. 25, 1914.
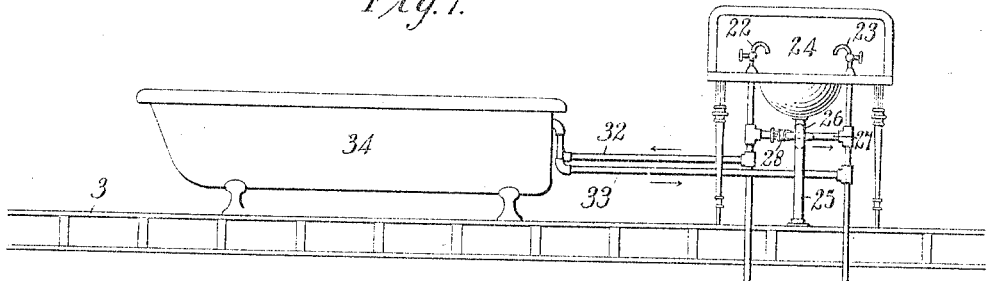
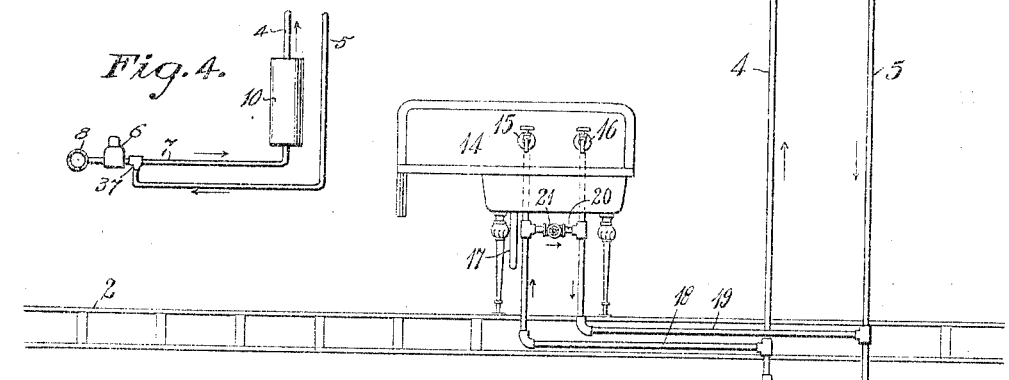
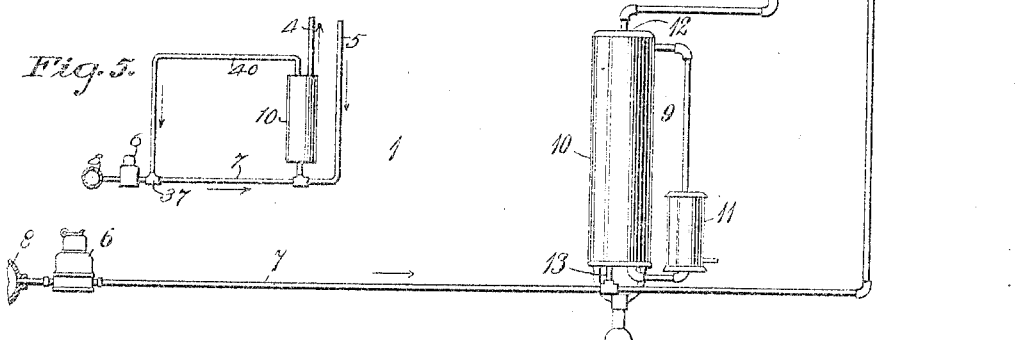
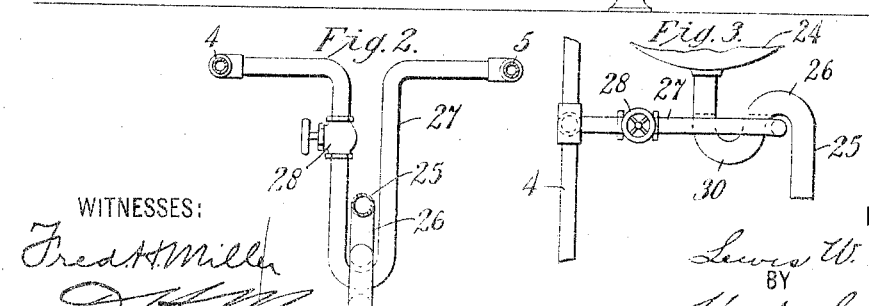
WITNESSES:
Fred H. Miller
D. W. Mace
INVENTOR
Lewis W. Chubb
BY
Wesley G. Carr
ATTORNEY

UNITED STATES PATENT OFFICE.

LEWIS W. CHUBB, OF EDGEWOOD, PENNSYLVANIA.

SYSTEM OF WATER DISTRIBUTION.

1,108,550.      Specification of Letters Patent.      Patented Aug. 25, 1914.

Application filed January 15, 1913. Serial No. 742,281.

*To all whom it may concern:*

Be it known that I, LEWIS W. CHUBB, a citizen of the United States, and a resident of Edgewood, in the county of Allegheny and State of Pennsylvania, have invented a new and useful Improvement in Systems of Water Distribution, of which the following is a specification.

My invention relates to systems of water distribution such as are employed in dwellings and other buildings, and it has special reference to independent hot-water and cold-water distribution systems and to means for preventing the water in the systems from freezing in cold weather.

One of the objects of my invention is to improve and simplify systems of the above indicated character and to provide means for interconnecting the hot-water and cold-water systems, which shall be simple in arrangement and inexpensive to install, and which shall perform its intended functions with effectiveness and reliability.

More specifically, the object of my invention is to interconnect the hot and cold-water systems at substantially their upper ends or at the ends of any branch pipes, whereby a gradual circulation of water may be effected throughout the entire system when desired, thereby preventing the freezing of the water in parts of the systems which may be exposed to severe weather conditions.

Another object of my invention is to provide simple, compact and adequate means for preventing the freezing of the water, which is retained in the traps, that are usually associated with the drain pipes of sinks, wash bowls and the like.

Dwellings and other buildings are usually provided with independent hot-water and cold-water systems, whereby both hot and cold water may be obtained from suitable faucets associated with various pieces of apparatus located in different parts of the building, such as sinks, wash-bowls and bath tubs. Frequently the water pipes are located along the exterior of the structure and are, therefore, exposed to severe cold in winter weather, which often results in freezing the water in the pipes and causing them to burst. Heretofore, numerous devices and arrangements of pipes have been employed to overcome this difficulty and to prevent freezing but such means as have been employed in the past, have either been expensive and complicated to install, or have been inefficient and costly in operation. Furthermore, such devices have been inconvenient to manipulate and could not be relied upon for accomplishing their intended purpose.

I propose to overcome the difficulties heretofore encountered, and to provide means which may be cheaply and readily installed and operated, and which shall accomplish the desired results effectively and with reliability.

My invention may be best understood by reference to the accompanying drawings, in which—

Figure 1 is a diagrammatic view of portions of a dwelling provided with a system of water distribution embodying my invention, Figs. 2 and 3 are enlarged views respectively in plan and in side elevation, of a portion of the system shown in Fig. 1, and Figs. 4 and 5 are views of portions of systems embodying modifications of my invention.

Referring to the drawing, a dwelling or similar structure having a cellar or basement 1 and a plurality of floors 2 and 3 is provided with a hot-water system 4 and a cold-water system 5, which receive their supply of water in common through a water meter 6, and a feed pipe 7 from a water main or supply pipe 8. A hot-water heater 9 comprising a water tank 10 and a heating device 11 is associated with the hot-water system 4, being connected at, or near, its upper end 12 thereto and receiving its water through a branch pipe 13 that is connected to the feed pipe 7.

I have illustrated the water heater 9 as embodying a heating device 11 that is adapted for the use of gas as a heating medium, but it should be understood that my invention is not restricted to any particular type of heating device and that the heater shown is only illustrative of any suitable apparatus, which may be operated either continuously or intermittently, for raising the temperature of the water in the hot-water system.

A sink 14 is located on the floor 2, and, in accordance with the usual custom, is provided with a hot-water valve or faucet 15, a separate cold-water valve or faucet 16, and a drain pipe 17. The hot-water system 4 and cold-water system 5 are respectively connected to the hot-water faucet 15 and cold-water faucet 16 by means of branch pipes 18 and 19, and immediately beneath the sink 14, the branch pipes 18 and 19 are interconnected by means of a pipe 20 and a valve 21 which is independent of said valves or faucets 15 and 16.

The upper ends of the hot-water system 4 and cold-water system 5 terminate in faucets 22 and 23 which constitute parts of a wash bowl 24, or similar device, which is also provided with a drain pipe 25 having a trap 26 of the usual S type. A pipe 27 is connected between the hot-water system 4 and the cold-water system 5 substantially at their upper ends and said pipe 27 contains a valve 28 by means of which the two systems may be interconnected. For reasons to be hereinafter pointed out, I prefer that the interconnecting pipe 27 shall either be substantially U shaped and shall be located as shown in Figs. 2 and 3, in proximity to a portion 30 of the trap 26 in which water collects and is retained, or shall be actually mechanically associated therewith. The interconnecting pipe 27 may, however, be of any form desired or may be entirely independent of the trap 26.

Branch pipes 32 and 33 are respectively connected to the hot-water system 4 and cold-water system 5 and are adapted to deliver water in the usual manner to a bath tub 34. The branch pipes 32 and 33 may, or may not, be interconnected in the manner hereinbefore set forth.

Assuming the arrangement and location of apparatus and pipes to be as shown, in the normal operation of the system, the valves 21 and 28 are closed and cold-water is supplied to the cold-water system 5 and may be drawn from the faucets 16 and 23 and at one of the bath tub faucets (not shown), as is the usual practice. Furthermore, the water heater 9 supplies hot water to the hot-water system 4 and to the faucets 15 and 22 and one of the bath tub faucets (not shown).

In case of cold weather, and particularly at night, when no water is drawn through the systems, the several valves 21 and 28 are opened, whereupon the hot-water system 4 and cold-water system 5 are interconnected, after which the faucets 15, 16, 22, and 23 are opened temporarily to relieve any air. Thus, the hot water in the upper portion of the system 4 and in the branch pipe 18 is permitted to pass through the respective interconnecting pipes 27 and 20 into the cold-water system 5. As the water is gradually cooled, it settles, giving place to hot water from the heater 9. In this way a circulation of relatively warm water is effected throughout the entire system in accordance with well-known principles and as indicated by the arrows, thereby preventing the possibility of freezing the water in any of the pipes. It should be noted that the interconnecting pipes are associated with the adjacent hot and cold water distributing pipes at points somewhat below or on the supply side of the outlet valves or faucets whereby the extreme portions of the distributing pipes above or beyond the interconnecting pipes may serve to catch or trap the air that is entrained in the circulating water. Moreover, these extreme portions are of liberal capacity to receive all the air that may accumulate, thus preventing a stoppage of the circulation which would otherwise result if the air filled the interconnecting pipes. Furthermore, inasmuch as the interconnecting pipe 27 is located in proximity to the drain pipe trap 26, there is sufficient radiation of heat from the warm circulating water to prevent the water in the trap from freezing. Moreover, by reason of the fact that the interconnecting pipes 27 and 20 are located substantially at the ends of the systems 4 and 5 and the branch pipes 18 and 19, there is sufficient heat imparted to the water which may be contained in the adjacent faucets 15, 16, 22 and 23 and extreme portions by convection and conduction to prevent its freezing. In order to resume normal operation of the systems, it is only necessary to close the interconnecting valves 28 and 21 and to draw off the warm water remaining in the cold-water system 5 through one of the cold-water faucets 23 or 16.

In some cases the common feed pipe 7 may be located in an exposed place and must, therefore, be protected to insure against freezing and bursting of the pipe. To effectively accomplish this purpose, it is only necessary to connect the cold water system 5 to the feed pipe 7 at a point 37, adjacent to and inside the water meter 6, as shown in Fig. 4. If now the hot-water and cold-water systems 4 and 5 are interconnected, as hereinbefore described, it is manifest that a circulation of warm water passes through both of said interconnected systems, including the feed pipe 7 in the direction of the arrows. Another means of preventing the freezing of water in the feed pipe 7 is to connect a pipe 40 between substantially the upper end 12 of the tank 10 and the feed pipe 7 at the point 37, as shown in Fig. 5. By this arrangement, warm water is circulated through the pipes 40 and 7 in the direction indicated by the arrows. These and other modifications are contemplated, and it will be understood by those skilled in the art that other systems differing widely in some respects from that hereinbefore set forth, may embody the principles of my invention and may secure the advantages and beneficial results thereof to a greater or less extent. I, therefore, do not wish to be limited to the specific arrangement and location of parts hereinbefore set forth, as the particular system described is only a preferred embodiment, illustrative of my invention in a broad sense, and I desire that only such limitations shall be imposed as are indicated in the appended claims.

I claim as my invention:

1. The combination with a hot-water system and a cold-water system receiving water from a common supply, and independent valves respectively associated with the ends of said systems, of means independent of said valves for interconnecting the upper portions of said systems whereby warm water is circulated through substantially the whole of said systems.

2. The combination with a hot-water system and a cold-water system receiving water from a common supply, and a plurality of independent valves respectively associated with the ends of said systems, of an interconnecting means independent of said valves associated with the upper portions of said systems for permitting hot-water to pass through the entire cold-water system.

3. The combination with a hot-water system and a cold-water system receiving water from a common source, and a plurality of valves respectively associated with said systems, of means independent of said valves for interconnecting said systems for effecting a circulation of water through the entire systems.

4. The combination with a hot-water system and a cold-water system and a plurality of independent valves respectively associated with the ends thereof, of interconnecting means independent of said valves and disposed between said systems at substantially the ends thereof and on the supply side of said valves for causing water from the hot-water system to pass through substantially the whole of said cold-water system.

5. The combination with a branched system of water distribution, a water-heating apparatus in one of said branches, and controlling valves respectively associated with the ends of said branches, of means independent of said valves and disposed above said apparatus and on the supply side of said valves for causing a circulation of warm water through the entire system and said heating apparatus for preventing the freezing of water in any part of the system.

6. The combination with a hot-water and a cold-water system, a plurality of branches therefrom, and a plurality of outlets severally associated with said systems and said branches, of pipes independent of said outlets and disposed on the supply side thereof for interconnecting said systems and branches at substantially the ends thereof and valves severally disposed in said interconnecting pipes.

7. The combination with a plurality of normally independent systems of water distribution, separate outlet valves therefor, and a water heater associated with one of said systems, of means disposed on the supply side of the valves for interconnecting the upper portions of said systems whereby warm water rises from the water heater through its associated system and returns to the heater through the other system.

8. The combination with a plurality of water distributing systems, a receptacle provided with outlets for drawing off said water, and a drain pipe and trap for said receptacle, of a pipe interconnecting said systems adjacent to said outlets and disposed in proximity to said drain pipe and trap.

9. The combination with a hot-water and a cold-water system, a receptacle associated therewith, and a drain pipe and trap for said receptacle, of a pipe interconnecting said systems adjacent to said receptacle for permitting a water circulation through the systems, said interconnecting pipe being disposed in close proximity to said trap to prevent the freezing of water therein.

10. The combination with a supply main, a hot-water and a cold-water system of water distribution, a common feed pipe therefor connected to the supply main, and a water meter in said feed pipe, of a pipe and valve connecting the upper portions of said systems, the lower portion of the cold water system being connected to the feed pipe adjacent to the meter and on the side thereof removed from the supply main.

11. The combination with a supply main, a hot-water and a cold-water system of water distribution, a plurality of independent valves respectively associated with the upper ends of said systems, and a common feed pipe therefor connected to the supply main, of a water-heater in said hot-water system, a pipe and valve independent of said first valves connecting the upper portions of said systems below said valves, the cold-water system being connected to the feed pipe adjacent to said supply main.

12. The combination with a supply main, a feed pipe connected thereto and a water meter connected in said feed pipe, of a hot-water and a cold water system of water distribution receiving water in common from said feed pipe, the cold water system being connected thereto adjacent to the meter and on the side thereof removed from the supply main, a plurality of separate valves severally associated with the respective ends of said systems, and a pipe interconnecting the remote portions of said systems, said valves being located beyond said interconnecting pipe.

13. The combination with a supply main, a water-heating apparatus, and a feed pipe and water meter connected between said supply main and said heating apparatus, of a hot-water system of distribution associated with said heating apparatus, a cold-water system of distribution connected to said feed pipe adjacent to the water meter on the side thereof removed from said supply main, and means associated with the upper portions of said systems for interconnecting the same and permitting a local water circulation through said systems and exclusive of said meter.

14. The combination with a water-heating apparatus, a supply pipe connected thereto, a hot water distributing system connected to said heating apparatus and a cold-water distributing system connected to said supply pipe, of means for interconnecting said hot and cold water systems at points slightly below the ends thereof for effecting a circulation of warm water through both of said systems and the heating apparatus.

15. In a water distribution system for a building, the combination with a water supply main, a feed pipe connected thereto and located in the lower portion of the building, hot-water and cold-water distribution pipes receiving water in common from said feed pipe and adapted to deliver water to the upper portions of said buiding, and a plurality of valves respectively associated with the upper ends of said distributing pipes, of a pipe and valve located beneath said valves and interconnecting substantially the uppermost portions of said hot and cold water pipes for completing a closed loop of the piping system and causing a local circulation of water throughout said loop to prevent the freezing of water in any part thereof.

In testimony whereof, I have hereunto subscribed my name this 13th day of January, 1913.

LEWIS W. CHUBB.

Witnesses:
J. R. BACKOFEN,
B. B. HINES.